UNITED STATES PATENT OFFICE.

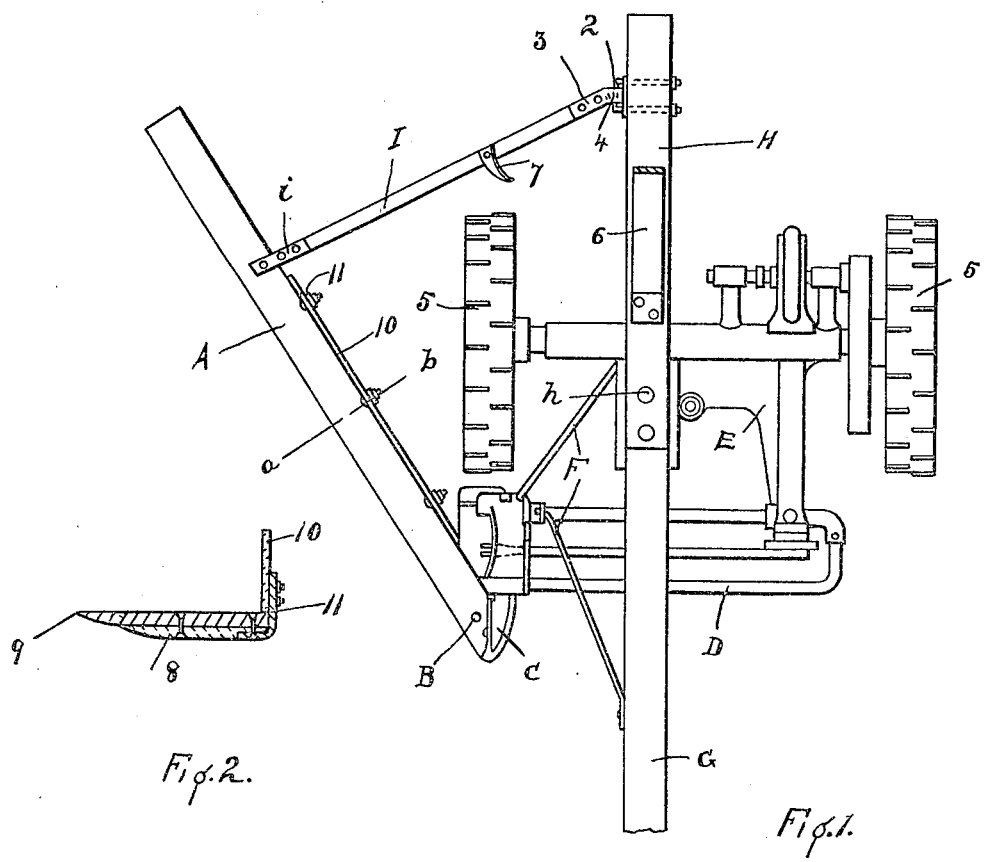

JULIUS CHARLES STEVENS, OF DIDSBURY, ALBERTA, CANADA.

BRUSH-CUTTING ATTACHMENT FOR MOWING-MACHINES.

No. 927,612.  Specification of Letters Patent.  Patented July 13, 1909.

Application filed July 23, 1908. Serial No. 445,024.

*To all whom it may concern:*

Be it known that I, JULIUS CHARLES STEVENS, of Didsbury, in the Province of Alberta, Canada, have invented new and useful Improvements in Brush-Cutting Attachments for Mowing-Machines, of which the following is a specification.

My invention relates to improvements in brush-cutting attachments for mowing-machines more particularly for use in connection with removing the heavy brush covering the ground in western Canada, and the object of my invention is to dispense with the set of knives and guards now used in the ordinary grass-mowers and brush-cutters; and to provide a simple, cheap, but most effective and strong apparatus for the purpose before set forth, and my invention consists of the parts hereinafter particularly described and pointed out in the claims forming part of this specification.

Figure 1 is a plan-view of an ordinary mowing-machine with my knife attached thereto, and Fig. 2, is an enlarged cross-section on the line a—b, Fig. 1.

In the drawings, like characters of reference indicate corresponding parts in each figure.

Although I show and describe my invention as being used in connection with the ordinary mower-machines (with the cutter-bar and its knife removed) it will be understood that I do not confine myself to using my invention in connection with any particular construction of mower-machine.

A is a non-reciprocating knife or blade which is held approximately at the angle shown to the line of draft which is approximately 40 degrees, so that, as the vehicle is drawn, it will be moved over the ground and sever the stocks of the brush. The front end B is suitably secured to the shoe C.

D is the front frame of the mower-frame E, and F are brace rods. The tongue G is extended beyond the back of the machine by means of an extension H bolted, or otherwise secured thereto, as shown at h.

I is a brace secured at i to the knife A. It will be noticed that the brace I passes behind its adjacent wheel of the mower machine, so that the knife A may be swung around its hinged connections without any hindrance.

2 is a U-shaped bracket supported on the extension H.

3 is a coupling secured to the brace I and pivoted to the bracket 2 by means of its pierced head 4.

It will of course be understood that the shoe C is pivoted to the mowing-machine frame; therefore wherever desired, the knife or blade A may be raised and lowered on the pivoted point of the shoe C, and on the bracket 2, by means of the brace I. The knife or blade A will be preferably mounted so that its front end will be in advance of the wheels 5.

6 is a seat-post, and 7 is a foot-rest secured to the brace I, and is placed in convenient relationship to the seat (not shown) carried on the seat-post 6. By means of the said foot-rest the driver can keep the rear portion of the knife or blade A as close to the ground as desired.

The ordinary lever and connection for raising and lowering the usual cutter-bar, have not been shown in the drawings, as the illustration of the same is not essential to a full comprehension of this invention: but it will be understood that the said lever and connection may be used to raise and lower the knife or blade A.

8 is a strengthening-strip preferably made of wood, suitably attached to the underside of the knife or blade A. Upon referring to Fig. 2 it will be noticed that the strengthening-strip 8 is so placed as not to interfere with the cutting-edge 9 of the knife or blade A.

10 is a wing or guard secured by suitable brackets 11 to the knife or blade A. This wing or guard projects above the knife or blade A at a suitable angle.

The knife or blade A will be made of very fine steel so that it will take and keep a very fine edge. As the knife or blade A is essentially moved in an angular position to the line of draft, it will be understood that it occupies the most advantageous position for the severing of the brush from its stock.

I find that the most advantageous angle at which the knife or blade A operates, is an angle of about 40 degrees, although it will be understood that the angle may be somewhat altered at which the knife operates. The knife or blade A must essentially be placed so that its front end will always be cutting far in advance of the rear or back end of the knife or blade.

What I claim as my invention is:

1. The combination with a mower-machine-frame; the wheels mounted therein; the tongue, and the shoe hinged to said frame in advance of one of the said wheels; of a non-reciprocating knife secured at its front end to the said shoe and held at an angle to the line of draft of the mower-machine; a support extending from the back of the said frame; a brace secured to said knife and resting behind one of the said wheels, and a bracket carried by the said support to which said brace is hinged, as and for the purpose specified.

2. The combination with a mower-machine-frame; the wheels mounted therein; the tongue, and the shoe hinged to said frame in advance of one of the said wheels; of a non-reciprocating knife secured at its front end to the said shoe and held at an angle to the line of draft of the mower-machine; a support extending from the back of the said frame; a brace secured to said knife and resting behind one of the said wheels; a bracket carried by the said support to which said brace is hinged, and a wing carried by said knife and situated between the said shoe and the said brace, as and for the purpose specified.

In testimony whereof I have signed my name to this specification, in the presence of two subscribing witnesses.

JULIUS CHARLES STEVENS.

Witnesses:
W. L. MARTIN,
J. M. REED.